(12) United States Patent
Sedayao et al.

(10) Patent No.: US 9,351,153 B2
(45) Date of Patent: May 24, 2016

(54) APPARATUS FOR END-USER TRANSPARENT UTILIZATION OF COMPUTATIONAL, STORAGE, AND NETWORK CAPACITY OF MOBILE DEVICES, AND ASSOCIATED METHODS

(71) Applicant: Intel Corporation, Santa Clara, CA (US)

(72) Inventors: Jeff Sedayao, San Jose, CA (US); John Vicente, Roseville, CA (US); Sanjay Rungta, Phoenix, AZ (US); Winson Chan, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/579,427

(22) Filed: Dec. 22, 2014

(65) Prior Publication Data

US 2015/0111567 A1    Apr. 23, 2015

Related U.S. Application Data

(60) Continuation of application No. 13/333,754, filed on Dec. 21, 2011, now abandoned, which is a division of application No. 11/618,228, filed on Dec. 29, 2006, now Pat. No. 8,280,431.

(51) Int. Cl.
| | |
|---|---|
| *H04B 7/00* | (2006.01) |
| *H04L 29/06* | (2006.01) |
| *H04M 3/42* | (2006.01) |
| *H04W 4/00* | (2009.01) |
| *H04M 1/00* | (2006.01) |
| *H04W 8/22* | (2009.01) |
| *H04L 29/08* | (2006.01) |
| *G06F 9/455* | (2006.01) |
| *H04W 88/02* | (2009.01) |

(52) U.S. Cl.
CPC ............. *H04W 8/22* (2013.01); *G06F 9/45533* (2013.01); *H04L 67/10* (2013.01); *H04W 4/00* (2013.01); *H04W 88/02* (2013.01)

(58) Field of Classification Search
USPC .............................. 455/550.1, 518, 519, 517
See application file for complete search history.

(56) References Cited

U.S. PATENT DOCUMENTS

| | | | |
|---|---|---|---|
| 5,675,762 A | * | 10/1997 | Bodin ................. G06F 12/1081 711/206 |
| 6,055,575 A | | 4/2000 | Paulsen |
| 6,272,334 B1 | | 8/2001 | Rao |

(Continued)

OTHER PUBLICATIONS

Ding et al., "Overlays on Wireless Mesh Network: Implementation and Cross-Layer Searching," Oct. 2006 (12 pages).

(Continued)

*Primary Examiner* — Tilahun B Gesesse
(74) *Attorney, Agent, or Firm* — Christopher K. Gagne

(57) ABSTRACT

Mobile devices, systems, and methods for end-user transparent utilization of computational, storage, and network capacity of mobile device are described herein. A communication interface may be responsive to a request for a resource from a network of mobile devices. A database may store mobile device information and, in response to the request, identify at least one mobile device having the resource. A virtual machine dispatcher may generate a command to a virtual machine dispatch agent of the at least one mobile device to create a virtual machine to perform the resource.

13 Claims, 7 Drawing Sheets

(56) References Cited

U.S. PATENT DOCUMENTS

| | | |
|---|---|---|
| 6,681,116 B1 | 1/2004 | Johnson |
| 6,717,222 B2 | 4/2004 | Zhang |
| 6,765,921 B1 | 7/2004 | Stacey |
| 7,177,191 B2 | 2/2007 | Fasoli |
| 7,190,974 B2 | 3/2007 | Efland |
| 7,693,977 B2 | 4/2010 | Du |
| 7,706,188 B2 | 4/2010 | Kim |
| 7,975,040 B2 | 7/2011 | Du |
| 8,266,624 B2 * | 9/2012 | Eigler .................. G06F 9/4843 709/201 |
| 8,280,431 B2 | 10/2012 | Sedayao |
| 8,325,731 B2 | 12/2012 | Fang |
| 2002/0094799 A1 | 7/2002 | Elliott |
| 2004/0081105 A1 | 4/2004 | Shimazaki |
| 2004/0260939 A1 * | 12/2004 | Ichikawa ................ G06F 21/10 726/5 |
| 2005/0153707 A1 | 7/2005 | Ledyard |
| 2005/0215287 A1 | 9/2005 | Efland |
| 2006/0155735 A1 * | 7/2006 | Traut ..................... G06F 9/445 |
| 2006/0155806 A1 | 7/2006 | Du |
| 2006/0165030 A1 * | 7/2006 | Fox ....................... G06F 9/4862 370/328 |
| 2008/0039055 A1 | 2/2008 | Hannikainen |
| 2008/0077767 A1 * | 3/2008 | Khosravi ............ G06F 12/1408 711/216 |
| 2008/0162625 A1 | 7/2008 | Sedayao |
| 2008/0186776 A1 | 8/2008 | Kim |
| 2010/0259961 A1 | 10/2010 | Fasoli |
| 2010/0318643 A1 | 12/2010 | Du |

OTHER PUBLICATIONS

Sedayao, "Intel IT Overlay," PlanetLab Workstop at HPLABS, May 11, 2006 (7 pages).

Office Action dated Dec. 18, 2014 in U.S. Appl. No. 13/333,754 (12 pages).
Office Action dated Jun. 27, 2014 in U.S. Appl. No. 13/333,754 (11 pages).
Office Action dated Nov. 7, 2013 in U.S. Appl. No. 13/333,754 (8 pages).
Notice of Allowance dated Aug. 27, 2012 in U.S. Appl. No. 11/618,228 (8 pages).
Office Action dated Feb. 13, 2012 in U.S. Appl. No. 11/618,228 (2 pages).
Office Action dated Oct. 7, 2011 in U.S. Appl. No. 11/618,228 (17 pages).
Office Action dated Apr. 25, 2011 in U.S. Appl. No. 11/618,228 (14 pages).
Office Action dated Dec. 9, 2010 in U.S. Appl. No. 11/618,228 (12 pages).
Office Action dated Jun. 4, 2010 in U.S. Appl. No. 11/618,228 (12 pages).
Office Action dated Feb. 25, 2010 in U.S. Appl. No. 11/618,228 (5 pages).
Notice of Allowance dated Feb. 23, 2010 in U.S. Appl. No. 11/027,493 (5 pages).
Office Action dated Jun. 2, 2009 in U.S. Appl. No. 11/027,493 (18 pages).
Office Action dated Oct. 1, 2008 in U.S. Appl. No. 11/027,493 (13 pages).
Office Action dated Jun. 3, 2011 in U.S. Appl. No. 12/754,338 (7 pages).
Notice of Allowance dated May 16, 2011 in U.S. Appl. No. 12/754,338 (10 pages).
Office Action dated Dec. 13, 2010 in U.S. Appl. No. 12/754,338 (6 pages).

* cited by examiner

APPARATUS FOR END-USER TRANSPARENT UTILIZATION OF COMPUTATIONAL, STORAGE, AND NETWORK CAPACITY OF MOBILE DEVICES, AND ASSOCIATED METHODS

CROSS-REFERENCE TO RELATED APPLICATION(S)

This application is a divisional of U.S. patent application Ser. No. 11/618,22, filed on Dec. 29, 2006, titled "APPARATUS FOR END-USER TRANSPARENT UTILIZATION OF COMPUTATIONAL, STORAGE, AND NETWORK CAPACITY OF MOBILE DEVICES, AND ASSOCIATED METHODS," priority to which is hereby claims and incorporated by reference in its entirety.

This application is related to the following application that is assigned to the same assignee as the present application:

Ser. No. 11/027,493, entitled "Systems and Methods for Virtualizing Functions and Decentralizing Service Delivery in a Flat Network of Interconnected Personal Devices", filed on Dec. 30, 2004.

TECHNICAL FIELD

Various embodiments described herein relate generally to networked devices and, more particularly, to improved devices, systems, and methods of enhanced service delivery among the networked devices.

BACKGROUND INFORMATION

Information technology has evolved from a highly centralized and provider-driven model towards a more decentralized model, which promotes user empowerment, innovation, and personalization. The telecommunications industry makes use of a very hierarchical model of device networking, which governs positioning and roles for the entire system, roughly the analogue of centralized mainframe computing before the advent of the microcomputer. In such a system, end users operating at the bottom of this network hierarchy have little or no influence or control on how services they require are delivered to them, and much of the computational resources of idle end-users systems, such as CPU (central processor unit) cycles, network capacity, and memory storage, go unused.

DETAILED DESCRIPTION

Figure 1:
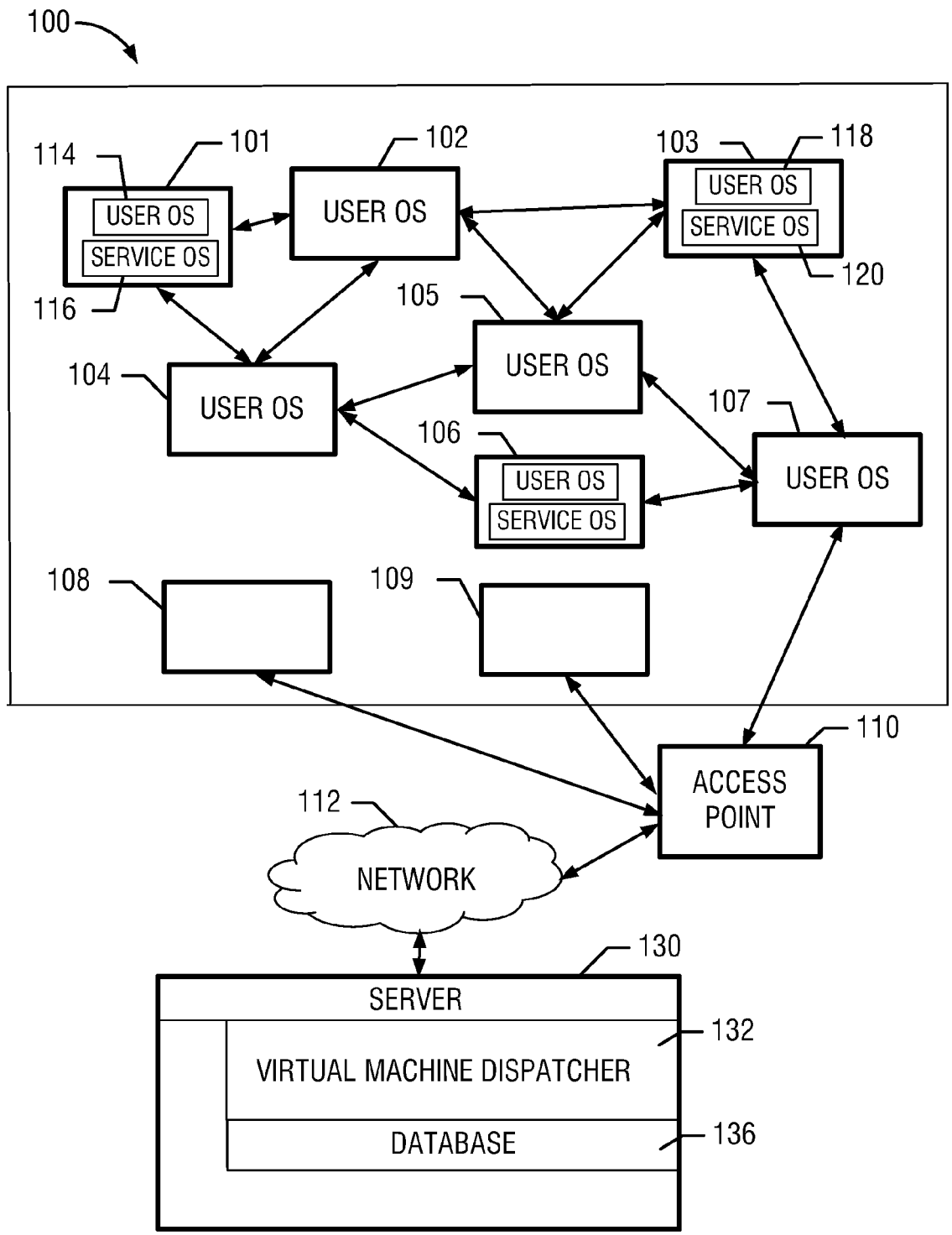
FIG. 1 is a block diagram of a network of mobile devices according to an example embodiment of the inventive subject matter.

In the following detailed description of embodiments of the subject matter, reference is made to the accompanying drawings, which form a part hereof, and in which is shown by way of illustration specific preferred embodiments in which the subject matter may be practiced. These embodiments are described in sufficient detail to enable those skilled in the art to practice the subject matter, and it is to be understood that other embodiments may be utilized and that structural, mechanical, compositional, electrical, and procedural changes may be made without departing from the spirit and scope of the subject matter. The following detailed description is, therefore, not to be taken in a limiting sense, and the scope of the subject matter is defined only by the appended claims.

As used herein, the phrase "some embodiments" refers to at least some embodiments of the subject matter. The various appearances of "some embodiments" are not necessarily referring to the same embodiments. If the specification states a component, feature, structure, or characteristic "may," "might," or "could" be included, that particular component, feature, structure, or characteristic is not required to be included. Reference in the specification to "an embodiment," "one embodiment" or "an example embodiment" means that a particular feature, structure, or characteristic described in connection with the embodiment is included in at least some embodiments, but not necessarily all embodiments, of the inventive subject matter.

Reference will now be made to the drawings. In order to show the structures of various embodiments most clearly, the drawings include diagrammatic representations of electronic apparatus. Thus, the actual appearance of the fabricated structures may appear different while still incorporating the essential structures of the illustrated embodiments. Moreover, the drawings show only the structure or representation that enables an understanding of the illustrated embodiments. Additional structure known in the art has not been included to maintain the clarity of the drawings.

Example embodiments of the inventive subject matter provide apparatus and methods for dispatching, managing, and maintaining services using virtual machines in a network, such as a wireless mesh. In example embodiments, unused or idle network resources may be used to perform service operations in a manner that occurs in the background and that is transparent to users of the affected devices. The service operations may be performed in a space-distributed and/or time-distributed manner that makes efficient use of unused network resources. In an example embodiment, a dynamic supply and demand model is implemented, through monitoring network resources to see what resources are available, and through appropriate utilization of available resources, as may be needed by consumers of network resources anywhere within the network. In example embodiments, the network consumers may include individual users of mobile devices, and they may also include various types of network services; however, network consumers are not limited to these.

Network services may be made especially effective when dispatched on a number of distributed hosts, such as a plurality of mobile devices in a wireless mesh network, as an example embodiment. These services may include grid computing, web proxies, content distribution systems, peer-to-peer file-sharing services, distributed file systems, name services, directory services, networking monitoring, and network measurement, as well as any other services, including enterprise services, that can take advantage of distribution to a greater or lesser degree.

FIG. 1 is a block diagram of a network 100 of mobile devices according to an example embodiment of the inventive subject matter. In an embodiment, a plurality of mobile devices 101-109 may be interconnected through a suitable wireless network technology.

"Suitable", as used herein, is intended to include having characteristics that are sufficient to produce the desired result(s). Suitability for the intended purpose can be determined by one of ordinary skill in the art using only routine experimentation.

The mobile devices 101-109 may be any devices with computational, network, and storage capabilities. In example embodiments, the mobile devices 101-109 are transportable by end users or subscribers. Such mobile devices may include, but are not limited to, laptop computers; handheld computing devices such as ultramobile personal computers and personal digital assistants (PDAs); mobile telephones; entertainment devices; communication devices; and vehicle-mounted or transported computer-based equipment.

In FIG. 1, network 100 may be a wireless mesh network among the mobile devices 101-109. The network 100 may communicate with another network 112 (which could be a corporate intranet or the Internet) through at least one access point 110.

A host computer system or server 130 may also be coupled to network 112. Server 130 may comprise a dispatcher and manager of virtual machines (also referred herein as "VM dispatcher") 132, and a database 136. The VM dispatcher 132 and database 136 may be arranged in any suitable organization or hierarchy. In an example embodiment, the VM dispatcher 132 and database 136 may be included within the same host. However, this arrangement is not essential, and other suitable configurations are possible. More than one server 130 may be provided to support network 100.

The mobile devices 101-109 may communicate wirelessly in an example embodiment. However, some mobile devices may alternatively or optionally communicate via a wireline connection, either to another mobile device or to access point 110. Access point 110 may be coupled to network 112 wirelessly or by wireline. Likewise, server 130 may be coupled to network 112 via either a wireless or wireline connection.

In network 100, a plurality of mobile devices 101-104, 106, and 107 may contain a user operating system (OS). For example, mobile device 101 may comprise a user OS 114, and mobile device 103 may comprise a user OS 118. The user operating systems, such as OS 114 and OS 118, may be identical to or different from each other.

One or more mobile devices, such as mobile devices 101, 103, 105, and 106 may contain a service operating system (OS). Many different types of services may be provided. In addition to the services mentioned elsewhere herein, such services may include content distribution services (including visually and/or audibly perceivable media), processing services including distributed processing, storage services including distributed storage, communication services including network monitoring and security monitoring, and so forth. In network 100, mobile device 101 may contain a service OS 116, and mobile device 103 may contain a service OS 120. The service operating systems, such as OS 116 and OS 120, may be identical to or different from each other.

Mobile devices 108 and 109, as depicted in FIG. 1, are not currently in service. They are illustrated as being coupled to access point 110, but they are currently idle, and any user or service operating system(s) associated with them may not be operating. They may optionally be coupled to other mobile devices 101-107 while they are idle.

The double-pointed lines coupling various mobile devices 101-109 in FIG. 1 represent merely one possible manner of interconnection. In an example embodiment, each mobile device may generally be coupled to at least one proximate mobile device, and several mobile devices are shown to be communicatively coupled to more than one proximate mobile device. For example, mobile device 103 is communicatively coupled to mobile devices 102, 105, and 107.

Figure 2:
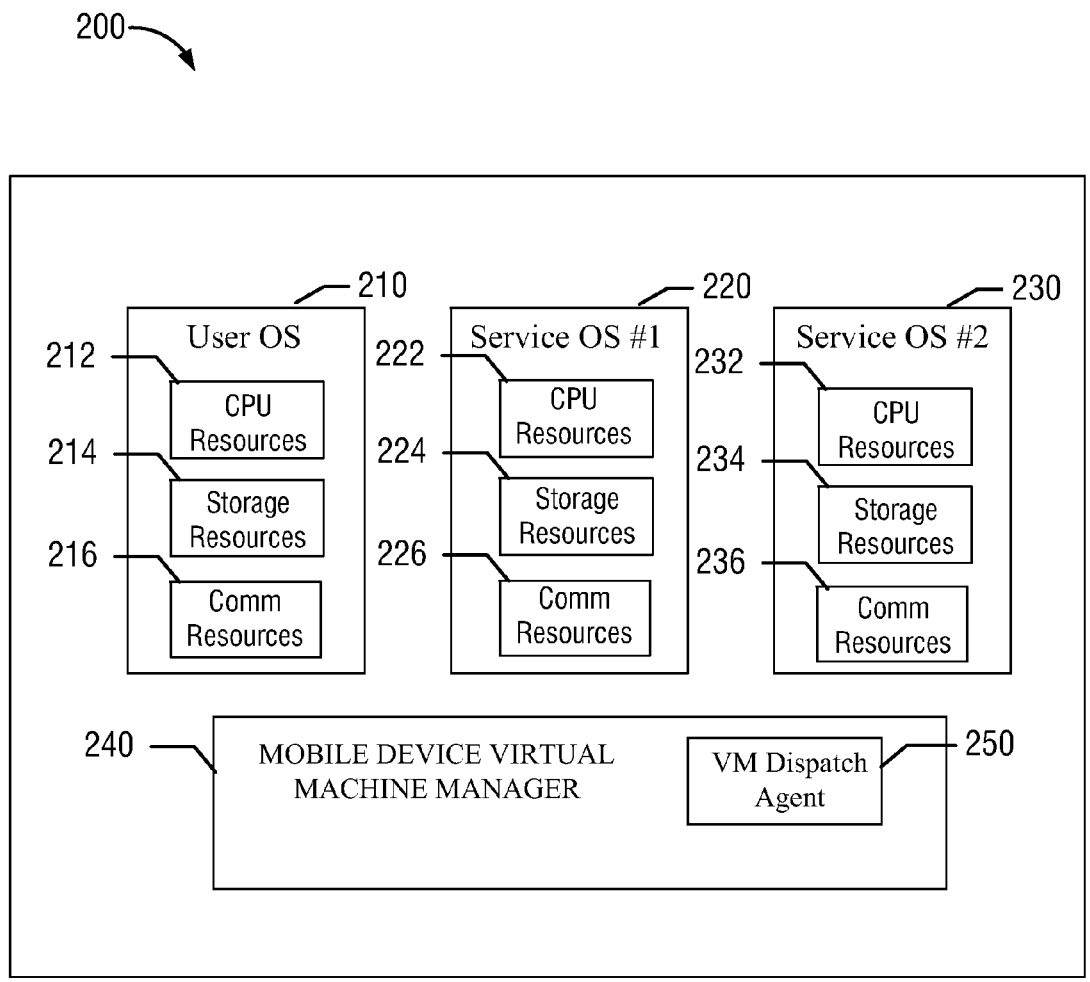
FIG. 2 is a high-level block diagram of a software stack in one of the mobile devices shown in FIG. 1, according to an example embodiment of the inventive subject matter.

FIG. 2 is a high-level block diagram of a software stack 200 in one of the mobile devices shown in FIG. 1, according to an example embodiment of the inventive subject matter. Each mobile device 101-109 may comprise a mobile device virtual machine manager (VMM) 240. The VMM 240 may comprise a virtual machine (VM) dispatch agent 250.

Each mobile device 101-109 may comprise a plurality of virtual machines (VMs). The software stack 200 of FIG. 2 contains a representation of three virtual machines 210, 220, and 230. In an example embodiment, VM 210 may be executing a user OS; VM 220 may be executing a first service OS; and VM 230 may be operating a second service OS.

VM 210 may comprise CPU resources 212 in the form of at least one processor. VM 210 may comprise further storage resources 214 in the form of any suitable memory device(s). VM 210 may additionally comprise communication resources 216 such as at least one communications node or interface, which may be wireless, wireline, or both.

Similarly, VM 220 may comprise CPU resources 222, storage resources 224, and communication resources 226. Likewise, VM 230 may comprise CPU resources 232, storage resources 234, and communication resources 236. The CPU resources 212, 222, and 232 may be of different or identical types. Likewise, the storage resources 214, 224, and 234 may each be of different or identical types. Further, the communication resources 216, 226, and 236 may each be of different or identical types.

In the mobile device software stack 200 shown in FIG. 2, the VM dispatch agent 250 has instantiated a virtual machine (VM) 210 running a user operating system (OS). The user of the mobile device interacts with VM 210 running the user OS, which has been allocated CPU resources 212, storage resources 214, and communication resources 216 by the VMM 240.

Invisible to the user, who optionally may only interact with the user OS, there may be one or more virtual node modules or machines 220 and 230 that may run a service OS that is dedicated toward running a service of the types mentioned above. The VM dispatch agent 250 may monitor resource consumption and network connectivity, and it may periodically send information relating thereto to a remote VM dispatcher, such as VM dispatcher 132 (refer to FIG. 1) on server 130.

Figure 3:
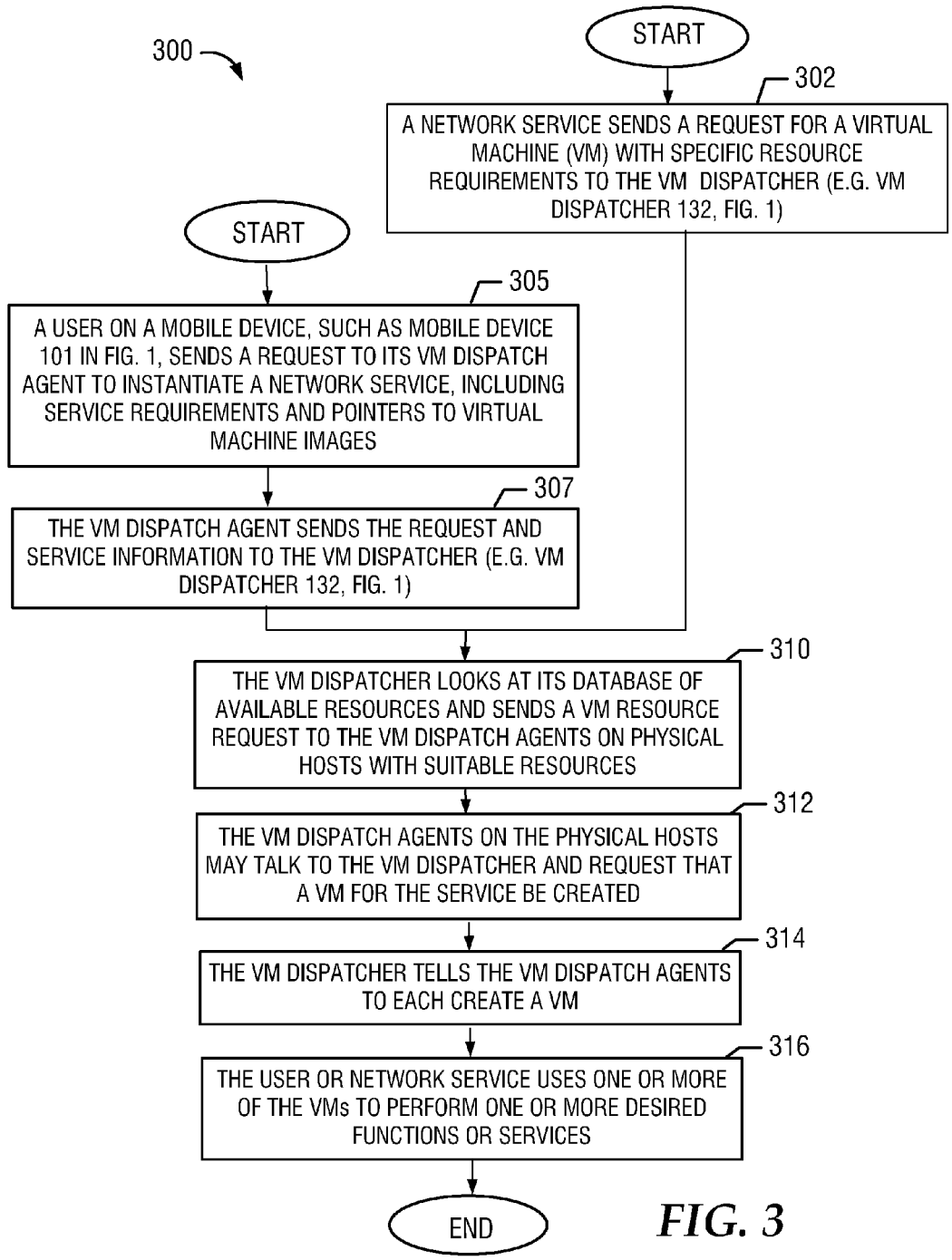
FIG. 3 is a flow diagram of example methods that could be carried out on devices in a network, such as a mobile device and a virtual machine dispatcher in FIG. 1, in accordance with various embodiments of the inventive subject matter.

FIG. 3 is a flow diagram 300 of example methods that could be carried out on devices in a network, such as a mobile device 101 and a VM dispatcher 132 in FIG. 1, in accordance with various embodiments of the inventive subject matter. FIG. 3 shows a process for a user of a mobile device or for a network service to request one or more virtual machines in a network, such as a wireless mesh network.

The flow diagram 300 may be started in block 302 and/or 305. Blocks 310, 312, 314, and 316 are common to both of the starting branches that begin with 302 and 305, respectively.

In 302, a network service may send a request to the server's VM dispatcher (e.g. VM dispatcher 132, FIG. 1) for one or more virtual machines with specific resource requirements.

In 305, a user on a mobile device or system such as a mobile device 101 in FIG. 1 may send a request to its associated VM dispatch agent to instantiate a network service, including service requirements and pointers to virtual machine images. In an embodiment, the user may send the request directly. In an alternative embodiment, the user may send the request indirectly, such as when a process the user is running on the mobile device makes the request a part of its normal operation. In an embodiment, the request for network service may include service requirements. In an embodiment, the request for network service may include pointers to virtual images.

In 307, the VM dispatch agent may send the request, including any service information, through the mesh network to the server's VM dispatcher (e.g. VM dispatcher 132, FIG. 1). In an alternative embodiment, the request may be sent directly to the VM dispatcher from the user.

In 310, the VM dispatcher may look at a record or database of available resources to identify a resource that will satisfy the request, and it may send a VM request for those resources to the VM dispatch agent(s) associated with one or more mobile devices that can provide suitable resource(s). In an embodiment, the VM dispatch request(s) may be sent only to mobile devices having suitable resources for the virtual machine resource being requested.

In 312, the request for VM creation and VM resources is received by the VM dispatch agent(s), which may talk to the VM dispatcher 132 and request that one or more virtual machines for the service be created. This method enables mobile device resources to be utilized for the provision of a service.

In 314, the VM dispatcher may command the VM dispatch agents to each create a VM. In an embodiment, the virtual machines to be created may include virtual machines to perform network services, such as those mentioned elsewhere herein.

In an embodiment, the virtual machines to be created may include virtual machines to perform storage services, such as a distributed hash table service, or any storage services of the types mentioned elsewhere herein.

In an embodiment, the virtual machines to be created may include virtual machines to perform computing (CPU) services, such as providing CPU cycles to run simulations, or any computing services of the types mentioned elsewhere herein.

In 316, the requesting user or network service uses the newly created one or more virtual machines to perform one or more desired functions or to provide one or more desired services. In an embodiment, the newly created virtual machines may include any combination of the virtual machines described in 314. In another embodiment, the newly created virtual machines may include other resources such as network and/or storage resources.

An example of a network service requesting VM resources in the mesh network will now be discussed. As mentioned earlier, the users of mobile devices 101-104, 106, and 107 "see" only a user OS (e.g. user OS 210, FIG. 2) in their interactions with mobile devices 101-104, 106, and 107, respectively. Let us assume that a content distribution service (merely as an example) desires to distribute files to all of the mobile devices 101-109. Distributing the files from network 112 may lead to a potential bottleneck at access point 110 as well as at the nodes (not shown) inside network 112 that might distribute the files.

In example embodiments of the inventive subject matter, the content distribution service may utilize the computational, storage, and network resources of mobile devices 101-109 to provide the service. When the service needs to use resources in mesh network 100, it may send a request to the VM dispatcher 132 for such resources. VM dispatcher 132 looks in its database 136 of available resources, finds that mobile devices 101, 103, and 106, for example, have sufficient resource capacity to distribute, store, and process the files, as requested, and it then sends a message to the VM dispatch agents on mobile devices 101, 103, and 106. The message may request that a service OS VM be created (e.g. Service OS #1, also identified as Service OS 220). As a result, service OS VM 220 is created on those mobile devices 101, 103, and 106, enabling other mobile devices close to them to get the distributed files from mobile devices 101, 103, and/or 106 without having to access the content distribution service through access point 110 and network 112, thus reducing the network traffic through access point 110 and on network 112.

Figure 4:
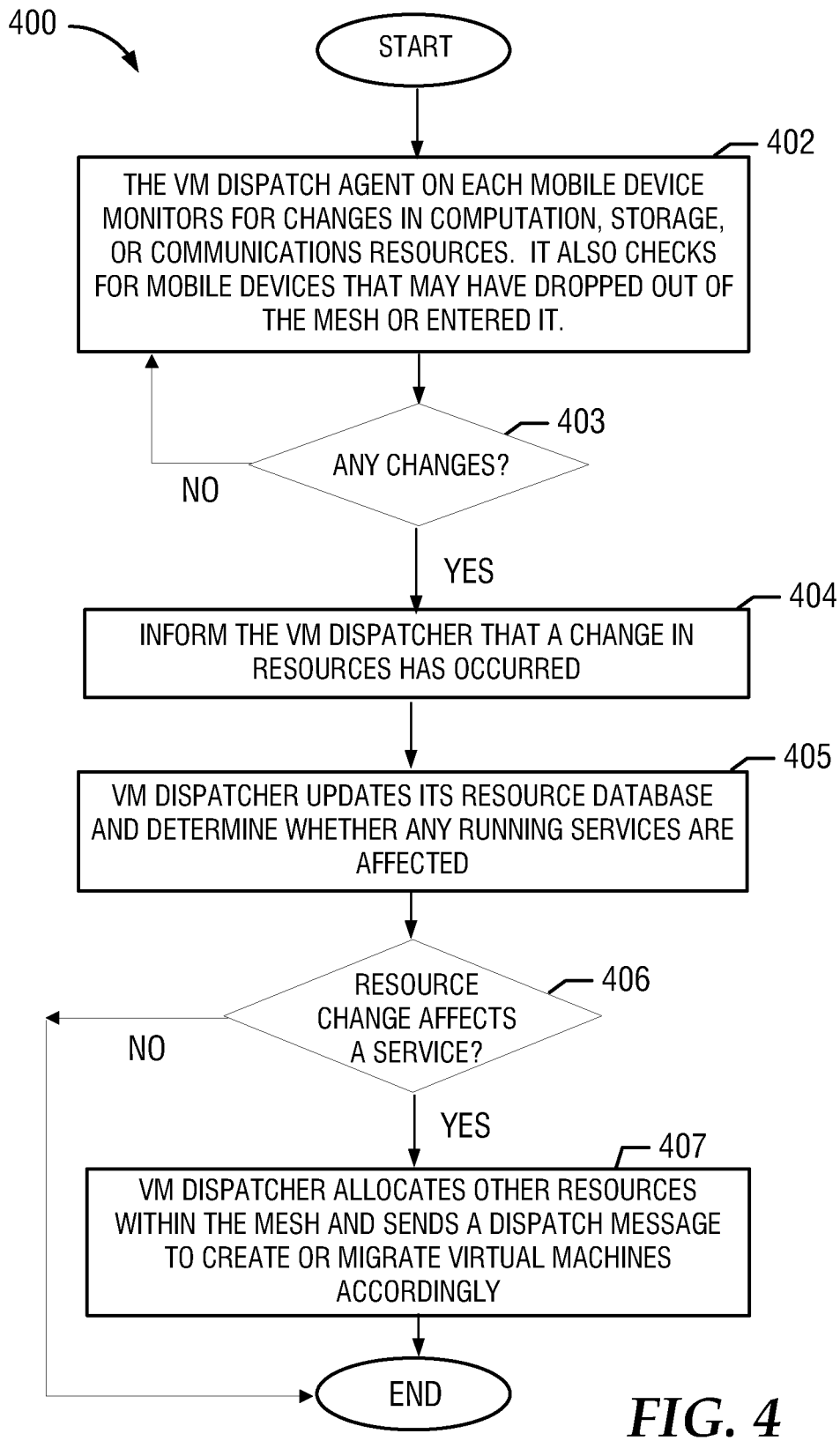
FIG. 4 is a flow diagram of example methods that could be carried out on devices in a network, such as a mobile device and a virtual machine dispatcher in FIG. 1, in accordance with various embodiments of the inventive subject matter.

FIG. 4 is a flow diagram 400 of example methods that could be carried out on devices in a network, such as a mobile device 101 and a server 130 in FIG. 1, in accordance with various embodiments of the inventive subject matter.

In 402, a VM dispatch agent on each mobile device monitors for changes in computational resources, storage resources, and/or communications resources. The VM dispatch agent also checks for dynamic changes to the network resources, such as mobile devices that may have dropped out of or left the network or that may have recently entered the network, e.g. through physical movement into the network and/or through activation within the network.

In 403, a determination is made by a suitable determination unit or element whether a change in resources in the mesh network connectivity, in CPU utilization, or in memory storage has occurred. If so, in 404, the determination element sends a message to the VM dispatcher to notify or inform it that a change in resources has occurred. In an embodiment, the VM dispatch agent may detect an actual change in resources in the mesh network. In an alternative embodiment, the VM dispatch agent may predict a change in resources in the mesh network based on an analysis of suitable factors.

In an embodiment, a change in the mesh network connectivity may be caused by an event such as a mobile device entering or leaving the mesh network, by a change in signal propagation between mobile devices on the mesh network, by a change in user load on the mesh network, or the like. In an embodiment, a change in CPU utilization may be caused by an event such as a mobile device entering or leaving the mesh network, by a mobile device entering or leaving standby mode, by a mobile device performing CPU intensive operations, and so on. In an embodiment, a change in storage may occur when a mobile device saves or deletes data from its local storage device, or when local storage capacity is added to or removed from a mobile device.

In 405, the VM dispatcher updates its resource database and may determine whether any running services are affected, using a suitable determination unit or element. In an embodiment, running services that may be affected include, but are not limited to, content distribution, network measurement, and grid computation.

In 406, a suitable determination element (not shown) associated with the VM dispatcher may check to see whether the change in resources affects any running services. If no running services are affected by the change in resources, the method ends. If any running services are affected by the change in resources, then the method may continue to 407. In an embodiment, the method may be structured as a loop. In such an embodiment, when the method ends, it may begin again from the beginning either immediately, or after a delay. In an alternative embodiment, the method does not begin until it is triggered by a suitable event.

In 407, the VM dispatcher may allocate other resources within the mesh network and send a dispatch message to create or migrate virtual machines accordingly. In an embodiment, virtual machines may be created after a new mobile device has been detected on the mesh network. In an embodiment, virtual machines may be created in response to additional storage capacity being detected on the mesh network. In an embodiment, virtual machines may be created in response to a change in network connectivity within the mesh network. In an embodiment, virtual machines may be migrated from a mobile device leaving the mesh network to a mobile device remaining on the mesh network. In an embodiment, virtual machines may be migrated from a mobile device with a high number of running processes to a mobile device with a lower number of running processes. In an embodiment, virtual machines may be migrated from a mobile device with a small amount of available storage capacity to a mobile device with a larger amount of available storage capacity.

In an embodiment, other resources may be allocated, and appropriate virtual machine migration or creation messages may be sent to the appropriate mobile devices. In such an embodiment, the VM dispatcher may adapt to changing conditions in the mesh network.

Figure 5:
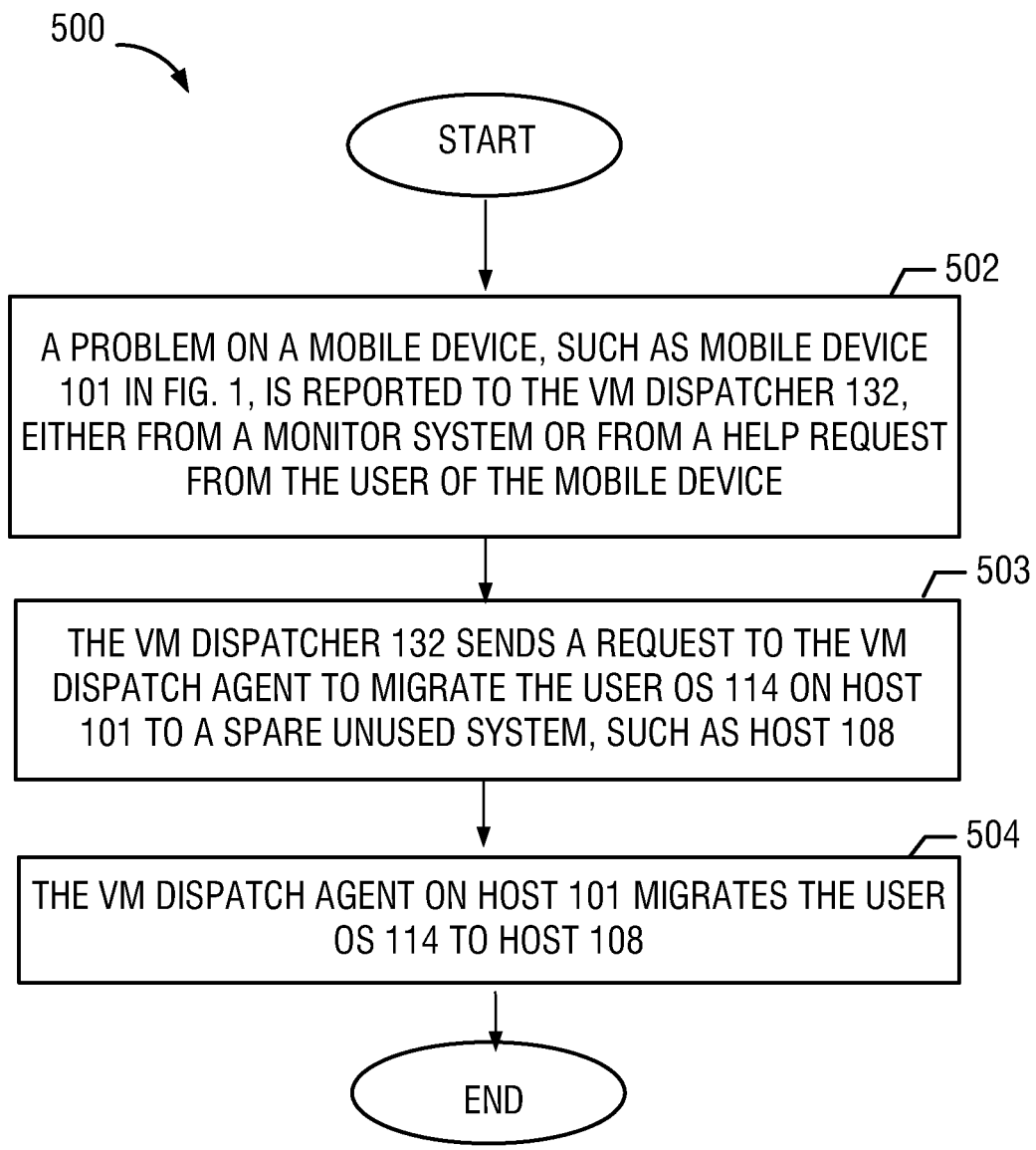
FIG. 5 is a flow diagram of example methods that could be carried out on devices in a network, such as a mobile device and a virtual machine dispatcher in FIG. 1, according to embodiments of the inventive subject matter.

FIG. 5 is a flow diagram 500 of example methods that could be carried out on a mobile device and a virtual machine dispatch host, such as a mobile device 101 and a VM dispatcher 132 in FIG. 1, according to various embodiments of the inventive subject matter.

In 502, a hardware and/or software problem on a mobile system such as mobile device 101 in FIG. 1 is reported to the VM dispatcher 132, either from a monitor system or via a help request from the user of the mobile device. In an embodiment, the problem may be reported automatically. In an alternative embodiment, the user may choose whether the problem is to be reported, or the user may manually report the problem. A suitable monitor system may, for example, be dedicated to detecting operational hardware and/or software errors in a mobile device.

In 503, the VM dispatcher 132 sends a request to the VM dispatch agent associated with the mobile device 101 experiencing the problem. The request instructs the VM dispatch agent on the mobile device 101 to migrate the user OS 114 to a spare unused mobile device, such as mobile device 108. In an embodiment, the spare unused mobile device or system may be one that the user currently owns. In an alternative embodiment, the spare unused mobile device may be supplied to the user by a source of idle mobile devices. An organization's IT (Information Technology) department may keep spare unused mobile devices and systems as part of a pool of spare equipment.

In 504, the VM dispatch agent on the mobile device 101 may migrate the user OS 114 to an idle mobile device 108, where it is restarted. In an embodiment, the user OS 114 may be shut down on the mobile device 101 experiencing problems before being migrated. In an alternative embodiment, user OS 114 may be migrated to an idle mobile device 108 and not restarted on the original mobile device 101.

Figure 6:
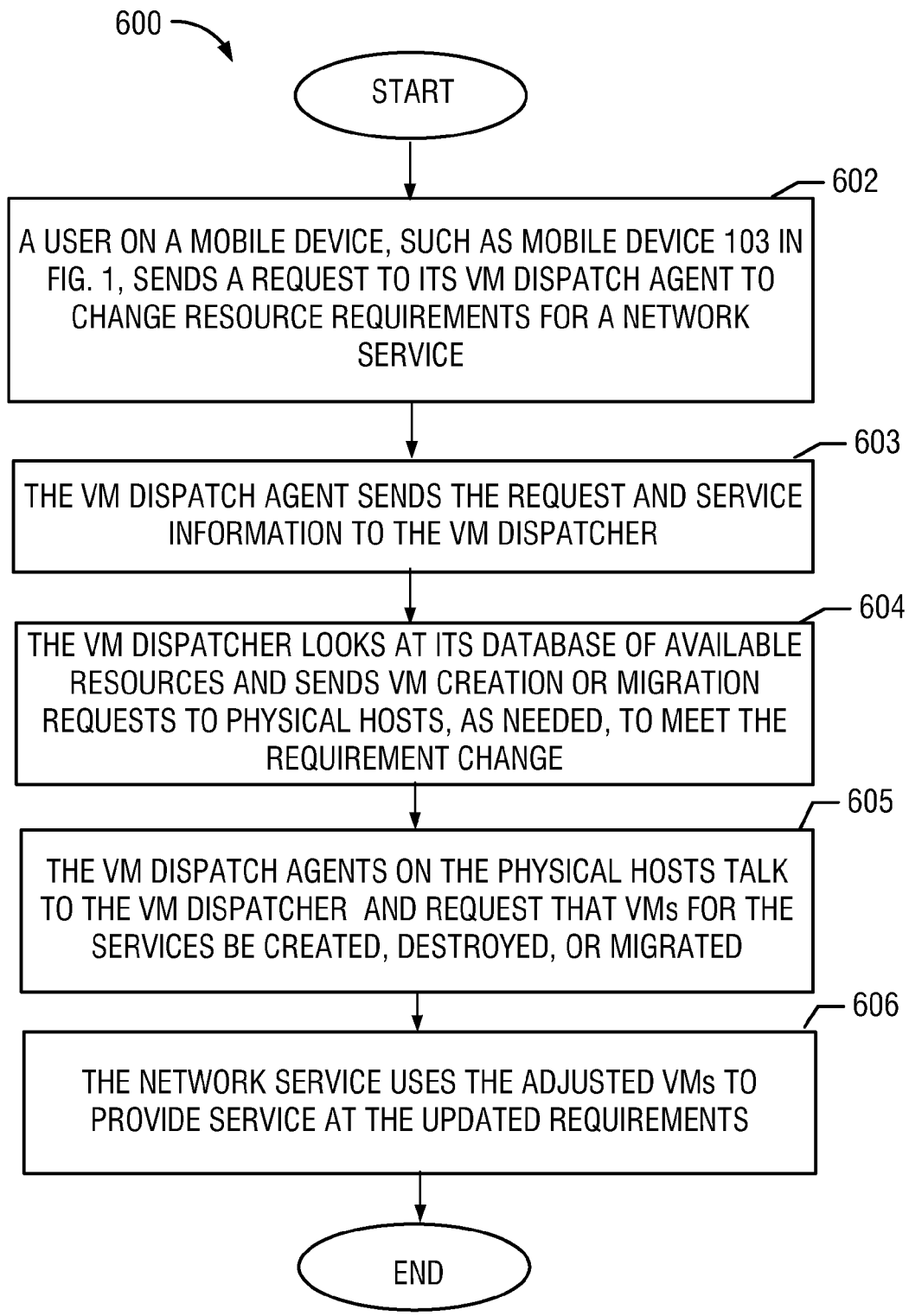
FIG. 6 is a flow diagram of example methods that could be carried out on devices in a network, such as a mobile device and a virtual machine dispatcher in FIG. 1, according to various embodiments of the inventive subject matter.

FIG. 6 is a flow diagram 600 of example methods that could be carried out on mobile devices in a network, such as a mobile device 103 and a VM dispatcher 132 in FIG. 1, according to various embodiments of the inventive subject matter.

In 602, a user on a mobile device, such as mobile device 103 in FIG. 1, may send a request to its associated VM dispatch agent to change resource requirements for a network service. In an embodiment, the user may send the request directly. In an alternative embodiment, the user may send the request indirectly, such as when a process the user is running on the mobile device makes the request as part of its normal operation. In an embodiment, the request to change resource requirements for a network service may be made in response to a change in network activity such as traffic, bandwidth usage, CPU usage, storage availability, or the like.

In 603, the VM dispatch agent 235 may send the request and service information to the VM dispatcher 132 on the server 130 (refer to FIG. 1). In an embodiment, the VM dispatch agent may forward the request, including any service information, through the mesh network 100 to the VM dispatcher 132. In an alternative embodiment, the request may be sent directly to the VM dispatcher 132.

In 604, the VM dispatcher 132 looks at its record or database 136 of available resources and may send virtual machine creation or migration requests to mobile devices, as needed, to meet the requirement change. In an embodiment, the number of virtual machine creation or migration requests sent may vary depending upon the number of physical hosts or mobile devices available. In an embodiment, the number of virtual machine creation or migration requests sent may vary depending upon the resources available on the available physical hosts or mobile devices.

In 605, the virtual machine dispatch agents on the physical hosts or mobile devices may talk to the VM dispatcher and request that virtual machines for the services be created, destroyed, or migrated, as may be suitable. In an embodiment, the virtual machines to be created, destroyed, or migrated may include virtual machines to perform network services such as those mentioned above. In an embodiment, the virtual machines to be created, destroyed, or migrated may include virtual machines to perform storage services such as those mentioned above. In an embodiment, the virtual machines to be created, destroyed, or migrated may include virtual machines to perform computing (CPU) services such as those mentioned above.

In 606, the network service may use the adjusted virtual machines to provide service at the updated requirements.

Figure 7:
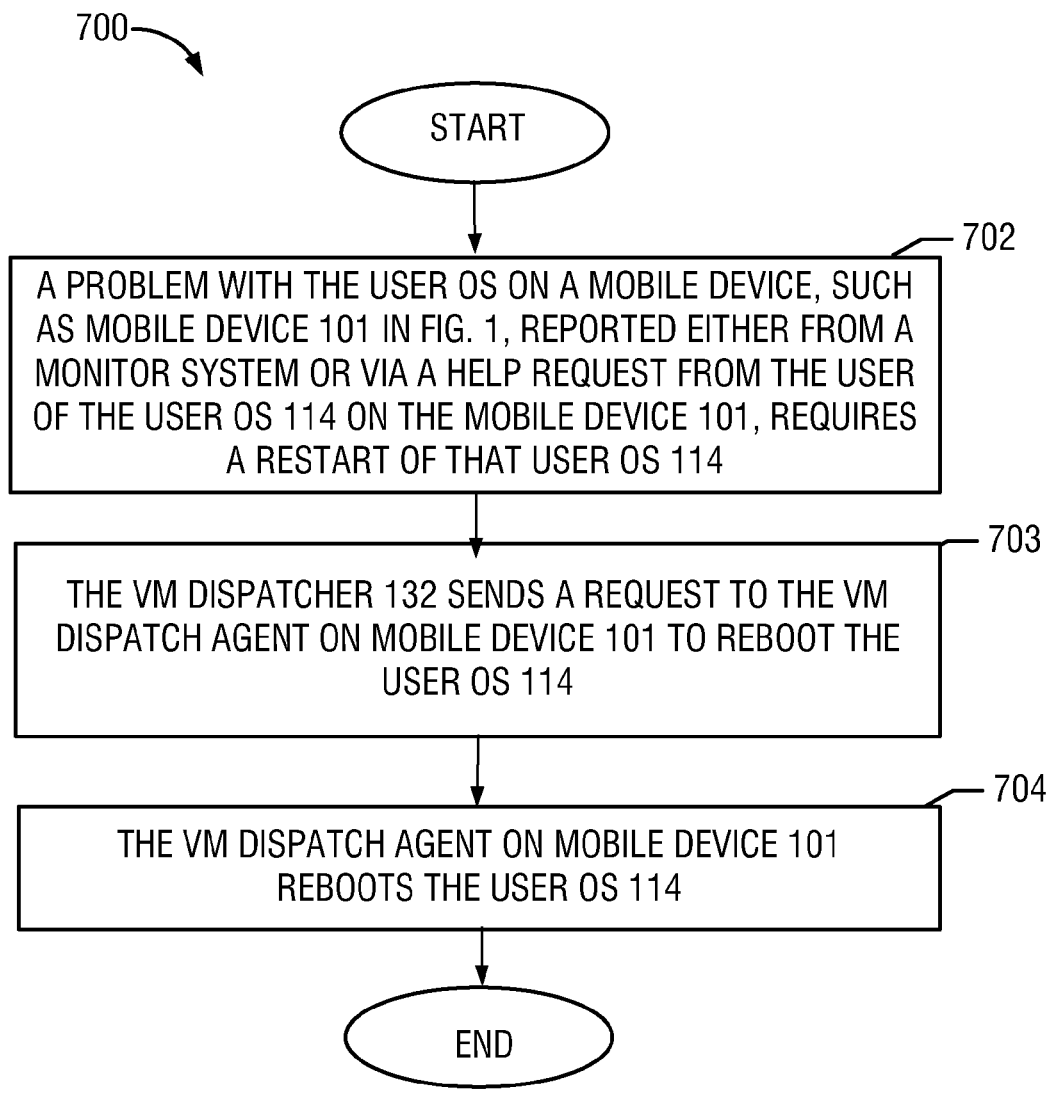
FIG. 7 is a flow diagram of example methods that could be carried out on devices in a network, such as a mobile device and a virtual machine dispatcher in FIG. 1, in accordance with various embodiments of the inventive subject matter.

FIG. 7 is a flow diagram 700 of example methods that could be carried out on devices in a network, such as a mobile device 101 and a VM dispatcher 132 in FIG. 1, in accordance with various embodiments of the inventive subject matter.

In 702, a hardware and/or software problem with the user OS on a mobile device such as mobile device 101 in FIG. 1, may be reported either from a monitor system or from a help request from the user of the user OS 114 on the mobile device. It is assumed for this particular example that the problem requires a restart of that user OS 114. In an embodiment, the restart may require stopping all processes and services running on the mobile device. In an embodiment, the restart may require stopping only some processes or services running on the mobile device. In an alternative embodiment, the restart may require only that the user log out and log in again.

In 703, the VM dispatcher 132 may send a request to the VM dispatch agent on mobile device 101 for the rebooting of the user OS 114. In an embodiment, the reboot request may be initiated directly by a user of the user OS 114 on the mobile device 101. In an embodiment, the reboot request may be generated automatically by a user OS monitoring system (not shown).

In 704, the VM dispatch agent on the mobile device 101 may reboot the user OS 114.

FIG. 1 is merely representational and is not drawn to scale. Certain proportions thereof may be exaggerated, while others may be minimized. FIGS. 1-7 are intended to illustrate various embodiments of the subject matter that can be understood and appropriately carried out by those of ordinary skill in the art. The operations described above with respect to the methods illustrated in FIGS. 3-7 may be performed in a different order from those described herein. Although the flow diagrams of FIGS. 3-7 show an "End", they may be performed continuously if desired.

The inventive subject matter provides for apparatus and methods for dispatching, managing, and maintaining services with end-user transparency using virtual machines in a network, such as a wireless mesh. Other embodiments will be readily apparent to those of ordinary skill in the art after reading this disclosure.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the subject matter. Therefore, it is manifestly intended that embodiments of the subject matter be limited only by the claims and the equivalents thereof.

It is emphasized that the Abstract is provided to comply with 37 C.F.R. §1.72(b) requiring an Abstract that will allow the reader to ascertain the nature and gist of the technical disclosure. It is submitted with the understanding that it will not be used to interpret or limit the scope or meaning of the claims.

The following paragraphs are not intended to be considered as claims for the purpose of fee determination. They are directed to additional embodiments of the inventive subject matter than those recited under the heading "Claims", and they may optionally be prosecuted as claims at a later date.

A computer network comprising:
  a plurality of mobile devices, selected ones of which include
    at least one virtual machine to execute a service operating system;
    a communications node; and
    a virtual machine dispatch agent; and
  a server including
    a communications interface to couple to the communications nodes, and responsive to a resource request from a first one of the selected mobile devices, wherein the resource request may potentially be satisfied by the server through the communications interface;
    a database to store mobile device resource information, wherein the database, in response to the request, is to identify at least a second one of the selected mobile devices as having a resource to satisfy the request; and
    a virtual machine dispatcher, responsive to the database, to generate a command to the virtual machine dispatch agent of the at least a second one of the selected mobile devices to create a virtual machine to satisfy the resource request, and to avoid using the server to satisfy the resource request.

The network recited above, wherein the virtual machine dispatcher is responsive to the virtual machine dispatch agent of each mobile device, and wherein the virtual machine dispatcher is to update the database in response to a change in mobile device resources.

The network recited above, wherein the virtual machine dispatcher further comprises a determination unit to determine whether the change in mobile device resources affects a service currently being provided and, if so, the virtual machine dispatcher is to generate a second command to the virtual machine dispatch agent of at least one other of the selected mobile devices to create a virtual machine to satisfy the affected resource request; and, if not, the second command is not generated.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. At least one non-transitory computer readable medium storing instructions that, when executed by at least one machine, result in performance of operations comprising:
  receiving, at a computer system, at least one request for provision of at least one service associated, at least in part, with at least one virtual machine to be comprised, at least in part, in at least one handheld mobile telephone device, the at least one virtual machine to be associated with at least one operating system, the at least one handheld mobile telephone device also to comprise, at least in part, at least one other virtual machine, the at least one other virtual machine to be associated with at least one other operating system, the computer system to manage, at least in part, the at least one virtual machine and the at least one other virtual machine, the least one other operating system to be hidden, at least in part, from the at least one operating system, the at least one handheld mobile telephone device being capable of executing a virtual machine manager;
  the at least one service to be provided, at least in part, via the at least one operating system, the at least one service comprising at least one enterprise service, network file sharing, and/or security-related processing.

2. The at least one computer readable medium of claim 1, wherein:
  the computer system comprises a server system.

3. The at least one computer readable medium of claim 1, wherein:
  the computer system comprises a host system.

4. The at least one computer readable medium of claim 1, wherein the operations further comprise:
  providing, at least in part, in response, at least in part, to the at least one request, the at least one service.

5. The at least one computer readable medium of claim 1, wherein:
  the at least one handheld mobile telephone device is capable of executing an agent;
  the at least one request is to be generated, at least in part, by the agent; and
  the at least one request is to be provided to the computer system via an intranet network.

6. The at least one computer readable medium of claim 1, wherein the operations further comprise:
  accessing, after receiving the at least one request, a database storing information related to the at least one handheld mobile telephone device.

7. The at least one computer readable medium of claim 1, wherein:

the security-related processing is associated with security monitoring.

8. At least one computer system usable in association with at least one handheld mobile telephone device, the at least one computer system comprising:

at least one server system capable of receiving at least one request for provision of at least one service associated, at least in part, with at least one virtual machine to be comprised, at least in part, in the at least one handheld mobile telephone device, the at least one virtual machine to be associated with at least one operating system, the at least one handheld mobile telephone device also to comprise, at least in part, at least one other virtual machine, the at least one other virtual machine to be associated with at least one other operating system, the computer system to manage, at least in part, the at least one virtual machine and the at least one other virtual machine, the least one other operating system to be hidden, at least in part, from the at least one operating system, the at least one handheld mobile telephone device being capable of executing a virtual machine manager;

the at least one service to be provided, at least in part, via the at least one operating system, the at least one service comprising at least one enterprise service, network file sharing, and/or security-related processing.

9. The at least one computer system of claim 8, wherein:
the at least one computer system comprises a host system.

10. The at least one computer system of claim 8, wherein:
the at least one server system is also capable of providing, at least in part, in response, at least in part, to the at least one request, the at least one service.

11. The at least one computer system of claim 8, wherein:
the at least one handheld mobile telephone device is capable of executing an agent;

the at least one request is to be generated, at least in part, by the agent; and the at least one request is to be provided to the at least one server system via an intranet network.

12. The at least one computer system of claim 8, wherein:
the at least one server system is also capable of accessing, after receiving the at least one request, a database storing information related to the at least one handheld mobile telephone device.

13. The at least one computer system of claim 8, wherein:
the security-related processing is associated with security monitoring.

* * * * *